United States Patent [19]
Lawrence

[11] 4,190,940
[45] Mar. 4, 1980

[54] METHOD OF ASSEMBLING AN ACTUATOR

[75] Inventor: Anthony J. Lawrence, Teddington, Near Tewkesbury, England

[73] Assignee: Tungum Hydraulics Limited, Cheltenham, England

[21] Appl. No.: 837,210

[22] Filed: Sep. 27, 1977

[51] Int. Cl.² ............................................. B23P 15/00
[52] U.S. Cl. .................................. 29/156.4 R; 29/405; 29/434; 29/511; 92/162 R; 73/368.3
[58] Field of Search ................... 29/434, 405, 156.4 R, 29/511; 92/162; 73/363, 363.3, 368, 363.1, 368.2, 368.3

[56] References Cited
U.S. PATENT DOCUMENTS

| | | | |
|---|---|---|---|
| 2,208,149 | 7/1940 | Vernet | 73/363 X |
| 2,507,466 | 5/1950 | De Craene | 73/363.3 |
| 3,034,207 | 5/1962 | Spase | 29/405 |
| 3,212,337 | 10/1965 | McCarrick | 73/368.3 |
| 3,503,262 | 3/1970 | Staire | 73/368.3 |
| 3,680,022 | 7/1972 | Bright | 73/368.3 X |
| 3,853,038 | 12/1974 | Roland | 92/162 X |
| 3,968,692 | 7/1976 | Blattler et al. | 73/363 |

FOREIGN PATENT DOCUMENTS 886241 1/1962 United Kingdom .
1275855 5/1972 United Kingdom .
1451613 10/1976 United Kingdom .

Primary Examiner—Charllie T. Moon
Attorney, Agent, or Firm—Young & Thompson

[57] ABSTRACT

A thermally sensitive actuator consists of a pressure cylinder comprising a tube, two end closure elements each secured to a respective end of the tube, a body of flowable material contained within the tube between the end closure elements, and a piston extending through a through-bore in one of the end closure elements and projecting into the body of flowable material. During assembly, the said body of flowable material is disposed within the tube between and abutting said end closure elements, while at least one of said end closure elements is not secured to the tube, so that said body of flowable material determines the distance apart of said end closure elements. The end closure elements are secured to the tube by displacing the peripheral edges of the ends of the latter inwardly.

3 Claims, 1 Drawing Figure

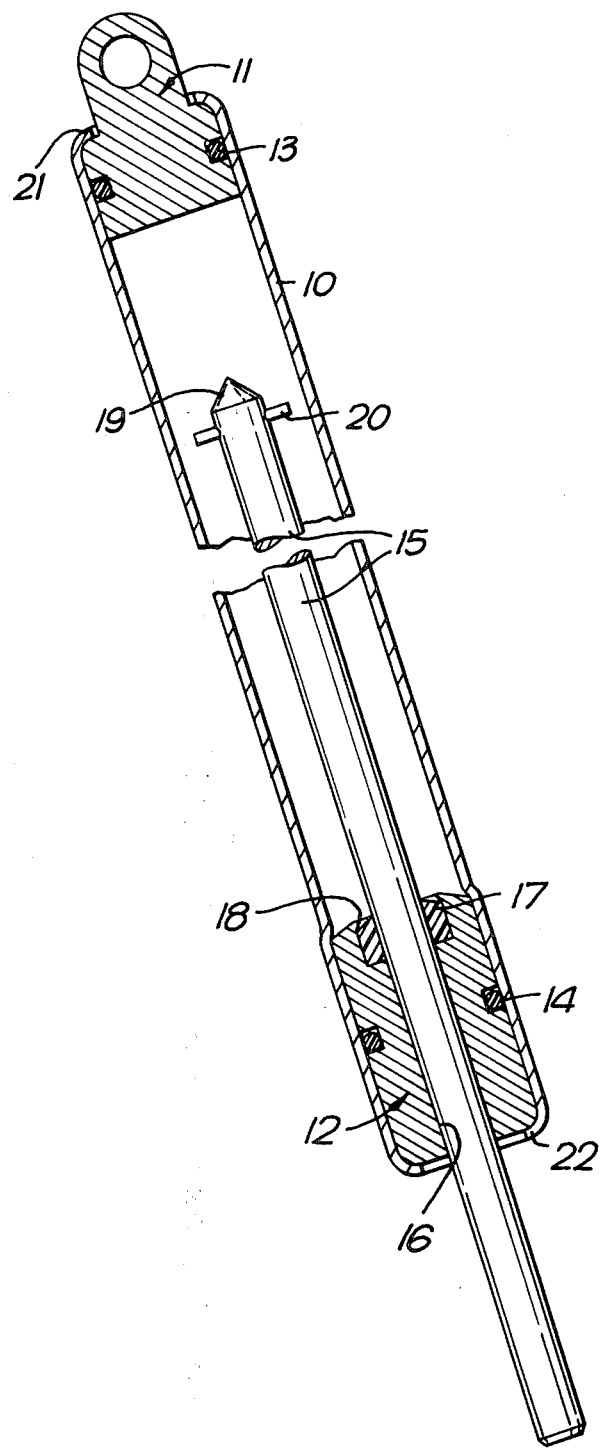

METHOD OF ASSEMBLING AN ACTUATOR

This invention relates to methods of assembling actuators and more particularly thermally sensitive actuators.

The particular type of actuator in relation to which the invention has been developed is for use in operating mechanisms for ventilation purposes, for example for opening and closing greenhouse windows, the actuator comprising a pressure cylinder containing a piston which is displaceable outwardly of the cylinder upon expansion of a flowable material contained within the cylinder, said material being wax or other material, such as alcohol or mercury, having a high coefficient of thermal expansion. Such cylinders comprise a tube and two end closure elements, one of which is of solid or continuous form and the other of which is provided with a through-bore to receive the piston rod.

In commonly used methods of production the end closure elements are attached to the tube by brazing and the thermally induced changes in the metal structure which arise from the brazing process tend to produce areas of reduced mechanical strength adjacent the braze. Bulging, or even rupture, of the tube adjacent the ends thereof is thus liable to occur when the ambient temperature exceeds the temperature at which no further outward movement of the piston is possible.

It is accordingly a specific object of the invention to provide a method of assembling an actuator of the above type in which the end closure elements are secured to the tube by a method which does not involve brazing or other operations involving application of heat. A more general object is the provision of a method of assembling an actuator of the above type which involves simple manufacturing processes.

According to the invention, there is provided a method of assembling an actuator having a pressure cylinder comprising a tube, two end closure elements each secured to a respective end of the tube, a body of flowable material contained within the tube between the end closure elements, and a piston extending through a through-bore in one of the end closure elements and projecting into the body of flowable material, said method including the step of disposing said body of flowable material within the tube between and abutting said end closure elements, while at least one of said end closure elements is not secured to the tube, so that said body of flowable material determines the distance apart of said end closure elements.

An embodiment of the invention will now be described by way of example with reference to the accompanying drawing which is a longitudinal cross-section through a thermally sensitive actuator.

The actuator comprises a tube 10, the ends of which are closed by respective end closure elements 11 and 12. The portion of the tube 10 between the closure elements is filled with a body of flowable material, such as wax, alcohol or mercury, having a high coefficient of thermal expansion. A respective resilient "O" ring 13, 14 is fitted in a groove in the outer periphery of each of the end closure elements 11 and 12 to provide a seal betwen such end closure element and the inner wall of the tube.

A piston 15, in the form of a rod, extends through a through-bore 16 in the end closure element 12 and projects into the flowable material. The inner end of the through-bore 16 is enlarged to accommodate a resilient seal 17 which engages between the end closure element 12 and the piston 15 and is held in place by an inwardly directed lip 18 formed on the edge of such enlarged recess.

Preferably, as shown, the inner end of the piston 15 tapers to a point 19 so that, should the piston 15 be forced to its fully inward position in which it makes contact with the end closure element 11, the flowable material in the tube can exert pressure on the tapering surface adjacent the point 19 when expansion next takes place. A pin 20 extends transversely through the piston 15 near the inner end thereof and serves, by engagement with the closure element 12, to prevent complete withdrawal of the piston 15 from the tube 10.

If the flowable material is a material which can be frozen at temperatures not inconveniently lower than room temperature, a unit of flowable material may be formed by producing a casting of the solidified material shaped to fit within the tube 10 and including a central hole to accommodate the piston 15 when the latter is inserted into the tube 10 to its maximum extent. The tube 10, unit of frozen flowable material, piston 15, and end closure elements 11 and 12 may then be assembled together with the unit of flowable material serving to maintain the required spacing between the two end closure elements 11 and 12 which are then secured in position in their respective ends of the tube 10. This latter operation may conveniently be effected by pressing the end edges 21 and 22 of the tube inwardly so as to embrace the respective end closure elements 11 and 12.

As an alternative to freezing the flowable material, a unit thereof may be formed by inserting the material, in liquid form, into a skin formed from flexible sheet material such as polyethylene. The package of flowable material so formed is then inserted into the tube 10 and the end closure elements 11 and 12 fitted with the piston 15 withdrawn to its maximum extent. Then, with the end closure elements 11 and 12 held in position, the piston rod 15 is driven into the tube 10 so as to pierce the polyethylene or other sheet material. Finally the end closure elements 11 and 12 are secured in their permanent positions. The presence of the sheet material in the tube 10 has no effect on subsequent operation.

A further method of assembling the actuator shown in the drawing, for use with a flowable material such as wax which hardens at the lower end of the temperature range encountered in normal use, is initially to fit the end closure element 12, with the piston 15 already installed therein, into one end of the tube 10 and displace the edge of such end inwardly to retain the end closure element 12 in position. Next, with the piston 15 fully extended so that the pin 20 abuts against the end closure element 12 and the tube 10 held vertical with its open end upwards, heated flowable material is poured in to completely fill the tube 10. The assembly is then cooled to a predetermined temperature, causing the flowable material to contract, harden and form a meniscus at the open end of the tube 10. The flowable material is then cut away to a predetermined depth from the open end of the tube and, with the assembly still at the predetermined temperature and with the piston 15 still fully extended, the other end closure element 11 is inserted so that it rests on the top of the flowable material and the edge of the adjacent end of the tube 10 is displaced inwardly to hold the end closure element 11 in position. Next, the assembly is heated to a second, higher predetermined temperature, causing the flowable material to expand, forcing the end closure elements 11 and 12 outwards. The outer edges of the end closure elements 11 and 12, which are initially of very small radius, bite into the overlapping inwardly displaced ends of the tube 10 and, at the same time, become more rounded. The overall effect is to increase the volume of the chamber containing the flowable material so that when the assembly is again cooled to a temperature at which the flowable material hardens, the piston 15 is drawn into the tube 10.

In use, the end closure element 11 is coupled to a first member and the piston to a second member, the positions of which members, one relative to the other, are to be varied in dependence on ambient temperature.

I claim:

1. A method of assembling an actuator having a pressure cylinder comprising a tube, two end closure elements each secured to a respective end of the tube, a body of flowable material contained within the tube between the end closure elements, and a piston extending through a through-bore in one of the end closure elements and projecting into the body of flowable material, said method including the steps of securing to one end of the tube the end closure element through which the piston extends, fully extending the piston, inserting heated flowable material into the tube with the open end thereof uppermost, cooling the flowable material to a first temperature at which it hardens, inserting the other end closure element into the open upper end of the tube, securing said other end closure element to the tube, and heating the body of flowable material to a second higher temperature whereby it expands and forces the end closure elements outwards from the positions in which they were initially secured.

2. A method according to claim 1, including the further step, after cooling the flowable material to said first temperature and before inserting the other end closure element into the open upper end of the tube, of removing flowable material to a predetermined depth from the open end of the tube.

3. A method according to claim 1, wherein the flowable material is chosen to be solid at said first temperature and liquid at the temperature to which it is heated before being inserted into the tube.

* * * * *